United States Patent [19]
Yoshioka et al.

[11] Patent Number: 4,722,951
[45] Date of Patent: Feb. 2, 1988

[54] COATING COMPOSITIONS

[75] Inventors: Hiroshi Yoshioka; Ichiro Ono; Hideki Sugahara, all of Gunma, Japan

[73] Assignee: Shin-Etsu Chemical Co., Ltd., Tokyo, Japan

[21] Appl. No.: 898,141

[22] Filed: Aug. 19, 1986

[30] Foreign Application Priority Data

Aug. 22, 1985 [JP] Japan ................................ 60-184791

[51] Int. Cl.$^4$ ......................... C08L 63/00; C08K 5/54
[52] U.S. Cl. .................................... 523/456; 524/188; 524/262; 524/263; 524/264; 524/265; 524/266; 528/28; 106/163.1; 106/169
[58] Field of Search ............... 524/188, 262, 265, 266; 528/28; 523/456

[56] References Cited
FOREIGN PATENT DOCUMENTS

| | | |
|---|---|---|
| 47-18985 | 1/1972 | Japan . |
| 48-4367 | 9/1973 | Japan . |
| 53-20530 | 2/1978 | Japan . |
| 0055341 | 5/1978 | Japan ................................... 524/262 |

Primary Examiner—Lewis T. Jacobs
Assistant Examiner—David W. Woodward
Attorney, Agent, or Firm—Jules E. Goldberg

[57] ABSTRACT

The coating composition, e.g. paints and lacquers, prepared according to the invention is imparted with greatly improved surface properties of the coating film formed therefrom in respect of the resistance against peeling of the coating film and decreased blocking by virtue of the unique additive which is an organopolysiloxane having, in a molecule, at least one organosiloxane unit having a 2,3-dihydroxypropylamino-substituted group such as $-C_3H_6-NH-CH_2-CHOH-CH_2OH$ and $-C_3H_6-NH-CH_2CH_2-NH-CH_2-CHOH-CH_2OH$ bonded to the silicon atom.

7 Claims, No Drawings

COATING COMPOSITIONS

BACKGROUND OF THE INVENTION

The present invention relates to an improvement in coating compositions, e.g. paints, lacquers and varnishes, or, more particularly, to an improvement in coating compositions capable of imparting the coated surface with decreased blocking as well as to a coating composition thus improved.

A problem generally encountered in a surface coated with a coating composition is that the surface is more or less susceptible to mechanical damages and stain or appearance of dullness in the luster when the surface is contacted with other solid bodies. Such undesirable phenomena are more remarkable when the coated surface is formed of a coating composition giving a coating film of low mechanical strengths.

For example, plywood boards coated with a lacquer or an aminoalkyd or urethane resin-based paint and colored iron sheets coated with an acrylic paint have a problem of so-called blocking to adhere to each other when they are stacked in layers one on the other and kept for a length of time. When such boards or sheets stored in layers are separated, the coating layers are more or less mechanically damaged or the luster of the surface is decreased. When a pressure-sensitive adhesive tape is applied to the coated surface and then peeled off, it is not rare that a part of the coating film is transferred to the adhesive tape resulting in a damaged surface. Further, a problem frequently encountered in the fabrication works of coated plywood boards using an adhesive is that the coating film is sometimes carried away by the adhesive when the surface is smeared with the adhesive and the adhesive is removed by wiping.

Various proposals and attempts have been made hitherto to solve the above described problem of defects in the coating films of conventional coating compositions. For example, Japanese Patent Publication 47-18985 teaches admixture of a coating composition with a dimethyl silicone fluid or a polyether-modified organopolysiloxane copolymer, Japanese Patent Publication 48-4367 teaches addition of an aminoalkyl-containing organopolysiloxane copolymer and Japanese Patent Publication 53-20530 teaches addition of a mercaptoalkyl-containing organopolysiloxane copolymer.

Each of these methods, however, has a problem in its part. For example, the method of the addition of a dimethylsilicone fluid is little effective in preventing the phenomenon of blocking in addition to the disadvantage of increased cissing or crawling although the method is considerably effective in the improvement of levelling of the coating layer on the surface, prevention of flooding and the like. The method of the addition of a polyether-modified organopolysiloxane copolymer or an aminoalkyl-containing organopolysiloxane copolymer is free from the disadvantage of increased cissing or crawling but not so effective as desired in preventing the phenomenon of blocking and the coating film formed of a coating composition containing such an additive is liable to be peeled when the coated surface is prolongedly kept with an adhering pressure-sensitive adhesive tape bonded thereto or when a pressure-sensitive adhesive tape is repeatedly applied to and peeled from the same area of the surface. The method of the addition of a mercaptoalkyl-containing organopolysiloxane copolymer is little effective for a urethane-based coating composition although the method is effective for the coating compositions of other types.

SUMMARY OF THE INVENTION

Thus, the present invention provides an improvement of a coating composition in respect of the above described problems and disadvantages in conventional coating compositions. The improvement of a coating composition provided by the present invention comprises admixing the coating composition with an organopolysiloxane having, in a molecule, at least one 2,3-dihydroxypropylamino-substituted monovalent hydrocarbon group selected from the class consisting of the groups represented by the general formulas $$-R-NH-CH_2-CHOH-CH_2OH, \quad (I)$$

$$-R-NH-CH_2-CH_2-NH-CH_2-CHOH-CH_2OH, \text{ and} \quad (II)$$

$$-R-N-CH_2-CH_2-NH-CH_2-CHOH-CH_2OH, \quad (III)$$
$$\quad | $$
$$CH_2-CHOH-CH_2OH$$

in which R is a divalent aliphatic hydrocarbon group having 1 to 6 carbon atoms, bonded to the silicon atom.

DETAILED DESCRIPTION OF THE PREFERRED EMBODIMENTS

As is understood from the above given summary, the feature of the improvement provided by the invention consists in the addition of a specific organopolysiloxane to the coating composition. The coating composition as the base of the improved coating composition according to the invention is not particularly limitative and any of conventional coating composition can be improved according to the invention including oil paints, water-base paints, spirit varnishes, coating compositions of which the vehicle is a cellulose derivative or a synthetic resin, and others. The vehicle resins include phenolic resins, aminoalkyd resins, epoxy resins, urethane resins and the like in oily coating compositions and polyvinyl chloride resins, polyvinyl acetate resins, polyacrylic resins and the like in emulsion-type coating compositions.

The organopolysiloxane used as the additive in the coating composition contains, in a molecule, at least one 2,3-di-hydroxypropylamino-substituted hydrocarbon group of the general formula (I), (II) or (III) given above bonded to the silicon atom. In the general formulas, the divalent aliphatic hydrocarbon group denoted by R is exemplified by those expressed by the following formulas, denoting a methyl group with the symbol Me: —CH$_2$—; —CH$_2$CH$_2$—; —CH$_2$CH$_2$CH$_2$—; —CH$_2$CHMeCH$_2$—; —CH$_2$CH$_2$CH$_2$CH$_2$—; —CH$_2$CH$_2$CH$_2$CH$_2$CH$_2$—; —CH$_2$CH$_2$CH$_2$CH$_2$CH$_2$CH$_2$—; and the like, though not limited thereto. Among the above named alkylene groups, a propylene group of the formula —CH$_2$CH$_2$CH$_2$— is preferred because of the relatively simple synthetic procedure of the organopolysiloxane containing the same.

The 2,3-dihydroxypropylamino-substituted group of the general formula (I), (II) or (III) is bonded to one of the silicon atoms in the organopolysiloxane forming a tri-, di- or monofunctional organosiloxane unit of the formula $$AR^1_a Y_b SiO_{(3-a-b)/2},$$

in which A is the 2,3-dihydroxypropylamino-substituted group of the general formula (I), (II) or (III), $R^1$ is a monovalent hydrocarbon group bonded to the silicon atom and exemplified by alkyl groups, e.g. methyl, ethyl, propyl and butyl groups, cycloalkyl groups, e.g. cyclohexyl group, and aryl groups, e.g. phenyl and tolyl groups, Y is a hydroxy group or a monovalent hydrolyzable group exemplified by alkoxy, amino, aminoxy, ketoxime and acyloxy groups, and a and b are each zero, 1 or 2 with the proviso that a+b is zero, 1 or 2.

Examples of such organosiloxane units include those expressed by the following unit formulas, in which $A^1$, $A^2$ and $A^3$ are the groups represented by the general formulas (I), (II) and (III), respectively, having a methylene group —$CH_2$— or a propylene group —$CH_2CH_2CH_2$— as the group denoted by R, Me is a methyl group and Et is an etyl group: $A^1SO_{1.5}$; $A^2SiO_{1.5}$; $A^3SiO_{1.5}$; $A^1MeSiO$; $A^2MeSiO$; $A^3MeSiO$; $A^1Me_2SiO_{0.5}$; $A^2Me_2SiO_{0.5}$; $A^3Me_2SiO_{0.5}$; $A^1Me(HO)SiO_{0.5}$; $A^1(EtO)_2SiO_{0.5}$; $A^2(MeO)SiO$; $A^2Me(MeO)SiO_{0.5}$; $A^2(MeO)_2SiO_{0.5}$; $A^3Me(MeO)SiO_{0.5}$; $A^3(MeO)_2SiO_{0.5}$; $A^3Me(HO)SiO_{0.5}$; and the like.

The organopolysiloxane as the additive to a coating composition according to the invention should contain at least one of the organosiloxane units such as those exemplified by the above given formulas. The other organosiloxane units which forms the organopolysiloxane molecule together with the above named organosiloxane units having a 2,3-dihydroxypropylamino-substituted group are not particularly limitative and include those represented by the unit formula $$R^2_cSiO_{(4-c)/2},$$

in which $R^2$ is a substituted or unsubstituted monovalent hydrocarbon group selected from the class consisting of alkyl groups, e.g. methyl, ethyl, propyl, butyl, hexyl, octyl, decyl and dodecyl groups, cycloalkyl groups, e.g. cyclohexyl group, alkenyl groups, e.g. vinyl, allyl and hexenyl groups, aryl groups, e.g. phenyl and tolyl groups, and aralkyl groups, e.g. 2-phenylethyl group, as well as those substituted groups obtained by the replacement of a part or all of the hydrogen atoms in the above named hydrocarbon groups with substituent atoms and/or groups, such as halogen atoms, cyano groups and the like, exemplified by chloromethyl, 3,3,3-trifluoropropyl and cyanomethyl groups, and the subscript c is 1, 2 or 3.

Examples of such organosiloxane units include those expressed by the following formulas, denoting methyl, ethyl, hexyl, octyl, decyl, dodecyl, vinyl and phenyl groups with Me, Et, Hx, Oc, Dc, Dd, Vi and Ph, respectively: $MeSiO_{1.5}$; $ViSiO_{1.5}$; $PhSiO_{1.5}$; $Me_2SiO$; $PhMeSiO$; $ViMeSiO$; $Ph_2SiO$; $HxMeSiO$; $DcMeSiO$; $Et_2SiO$; $Me_3SiO_{0.5}$; $PhMe_2SiO_{0.5}$; $ViMe_2SiO_{0.5}$; $OcMe_2SiO_{0.5}$; $DdMe_2SiO_{0.5}$; and the like.

The organopolysiloxane composed of at least two of the above named organosiloxane units may have a straightly linear, branched chain-like, cyclic or network-like molecular structure without particular limitations. The organopolysiloxane should have a viscosity in the range from 10 to 10,000 centistokes or, preferably, from 20 to 50,000 centistokes at 25° C. because an organopolysiloxane having a viscosity lower than above may exhibit no sufficient effect of improvement as desired while an organopolysiloxane having a viscosity higher than above is poorly compatible with the base coating composition to disadvantageously increase the phenomenon of cissing.

The organopolysiloxane used as the additive in the present invention can readily be prepared by the reaction of glycidol with an organopolysiloxane having, in a molecule, at least one organosiloxane unit having a group of the formula $NH_2$—R— or $NH_2CH_2CH_2NH$—R—, in which R has the same meaning as defined above, bonded to the silicon atom. The reaction is performed by dissolving the reactants in a suitable inert organic solvent such as aromatic hydrocarbon solvents, e.g. benzene, toluene and xylene, aliphatic hydrocarbon solvents, e.g. n-hexane and cyclohexane, and ethers, e.g. dipropyl ether and dibutyl ether, and keeping the mixture at a temperature in the range from 0° to 150° C. or, preferably, heating the mixture at a temperature in the range from 50° to 130° C.

The improvement of a base coating composition according to the invention can be achieved by merely admixing the coating composition with the above described specific organopolysiloxane. Athough the organopolysiloxane can be added as such to the base coating composition, it is sometimes advantageous in order to ensure uniformity of blending that the organopolysiloxane is dissolved beforehand in a small volume of an organic solvent such as toluene and xylene and the base coating composition is admixed with the organic solution of the organopolysiloxane. When the base coating composition is in the form of an aqueous emulsion, the organopolysiloxane also should be emulsified in an aqueous medium using a surface active agent and the emulsion is added to the base coating composition. The amount of the organopolysiloxane added to the base coating composition should be in the range from 0.001 to 15% by weight or, preferably, from 0.05 to 5% by weight based on the content of non-volatile matters in the base coating composition. When the amount of the organopolysiloxane is too small, the desired effect to be obtained by the addition thereof cannot be sufficient as a matter of course while an excessively large amount thereof has no additionally advantageous effect rather with some disadvantages due to the expensiveness of the additive and some adverse effects on the properties of the coating composition and/or the coating film formed therefrom.

In the following, examples and comparative examples are given to illustrte the effectiveness of the inventive improvement on the properties of coating compositions. The examples are preceded by the description of the procedure for the preparation of the specific organopolysiloxanes used as the additive. In the following description, the expression of "parts" always refers to "parts by weight" and the values of viscosity are all those obtained by the measurement at 25° C.

Preparation 1

Into a glass-made flask of 1 liter capacity equipped with a stirrer, thermometer, reflux condenser and dropping funnel were introduced 235.6 g (0.05 mole) of a 3-(2-aminoethylamino)propyl-substituted diorganopolysiloxane expressed by the formula

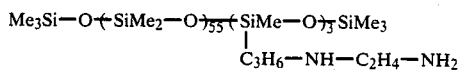

and 200 g of toluene to form a reaction mixture and the mixture was heated at 80° C. Into the mixture under agitation and kept at the same temperature, a mixture of 11.1 g (0.15 mole) of glycidol and 30 g of toluene was added dropwise through the dropping funnel over a period of 30 minutes. After completion of the dropwise addition of the glycidol solution, the reaction mixture was further agitated at 100° C. for additional 3 hours followed by stripping of toluene by distillation to give 238.7 g of a clear, yellow liquid.

This liquid product had a viscosity of 2524 centistokes, specific gravity of 0.992 and refractive index of 1.4171 at 25° C. and could be identified from the results of the infrared absorption spectroscopy and elementary analysis to be an organopolysiloxane having 2,3-dihydroxypropylamino groups and expressed by the formula

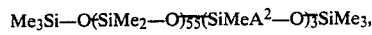

in which $A^2$ has the same meaning as defined before, R in the formula (II) being a propylene group —$CH_2CH_2CH_2$—.

Preparations 2 to 5

The experimental procedure in each of these Preparations was substantially the same as in Preparation 1 except that the use of a different aminoalkyl-containing starting organopolysiloxane to form a correspondingly different organopolysiloxane product as shown below. Table 1 given below summarizes the amount of the starting organopolysiloxane used in the reaction, amount of glycidol reacted with the starting organopolysiloxane, yield of the product organopolysiloxane and viscosity, specific gravity and refractive index at 25° C. of the product organopolysiloxane.

TABLE 1

|  | Preparation No. | | | |
|---|---|---|---|---|
|  | 2 | 3 | 4 | 5 |
| Starting organopolysiloxane taken, g | 244.2 | 252.8 | 224.9 | 147.8 |
| Glycidol taken, g | 18.5 | 25.9 | 3.7 | 14.8 |
| Product | | | | |

TABLE 1-continued

|  | Preparation No. | | | |
|---|---|---|---|---|
|  | 2 | 3 | 4 | 5 |
| organopolysiloxane | | | | |
| yield, g | 252.9 | 264.6 | 217.2 | 151.9 |
| viscosity, cS | 7402 | 8897 | 151 | 798 |
| specific gravity | 1.01 | 1.01 | 0.972 | 0.990 |
| refractive index | 1.4281 | 1.4366 | 1.4108 | 1.4389 |

EXAMPLES 1 TO 5 AND COMPARATIVE EXAMPLES 1 TO 3

In Examples 1 to 5, a urethane-based coating composition was prepared by uniformly blending 100 parts of an acrylic polyol resin (ACRYDIC, a product by Dai-Nippon Ink Chemical Co.), 15 parts of an isocyanate-based curing agent for the above mentioned resin (Vernoc 750, a product by the same company supra) and 4 parts of a thinner solvent and admixed with 1.5 parts of either one of the organopolysiloxanes prepared in Preparations 1 to 5, respectively, described above. The coating composition was applied to an overlay paper for plywood board in a coating amount of 20 to 25 g/m² using a bar coater #20 and, after air drying, heated at 60° C. for 15 minutes to form a cured coating film on the paper.

A cellophane-based pressure-sensitive adhesive tape (Cellotape, a product by Nichiban Co.) was applied and bonded to the thus coated surface of the paper under a load of 1 kg/cm² and rapidly peeled off and this procedure of bonding and peeling of the adhesive tape was repeated on the same area until the cured coating film was destroyed. The number of the repetition of the

| Preparation | Formula |
|---|---|
| | Starting organopolysiloxanes |
| 2 | Me₃Si—O-(SiMe₂—O-)₅₃-(SiMe—O-)₅SiMe₃<br>                                                              |<br>                                                              C₃H₆NHC₂H₄NH₂ |
| 3 | Me₃Si—O-(SiMe₂—O-)₅₁-(SiMe—O-)₇SiMe₃<br>                                                              C₃H₆NHC₂H₄NH₂ |
| 4 | (MeO—SiMe₂—O—)₂SiMe(C₃H₆NHC₂H₄NH₂) |
| 5 | NH₂C₃H₆Si(OEt)₂—O-(SiMe₂—O-)₁₅-Si(OEt)₂—C₃H₆NH₂ |
| | Product organopolysiloxanes |
| 2 | Me₃Si—O-(SiMe₂—O-)₅₃-(SiMe—O-)₅SiMe₃<br>                                                            C₃H₆NHC₂H₄NHCH₂CHOHCH₂OH |
| 3 | Me₃Si—O-(SiMe₂—O-)₅₁-(SiMe—O-)₇SiMe₃<br>                                                            C₃H₆NHC₂H₄NHCH₂CHOHCH₂OH |
| 4 | (MeO—SiMe₂—O—)₂SiMe(C₃H₆NHC₂H₄NHCH₂NHOHCH₂OH) |
| 5 | HOCH₂CHOHCH₂NHC₃H₆Si(OEt)₂—O-(SiMe₂—O-)₁₅—<br>                                                                                                                     Si(OEt)₂—C₃H₆NHCH₂CHOHCH₂OH | bonding and peeling carried out without destroying the coating film was recorded to evaluate the resistance against peeling. This test with an adhesive tape was performed also with the coated overlay papers after standing for 7 days at room temperature either with or without the adhesive tape bonded to the surface. The results are shown in Table 2 below.

For comparison, the same test as above was repeated excepting the omission of the organopolysiloxane additive in Comparative Example 1 or replacement of the organopolysiloxanes prepared in Preparations 1 to 5 with the same amount of the organopolysiloxane used in Preparation 1 as the starting organopolysiloxane in Comparative Example 2 or a mercaptopropyl-containing organopolysiloxane of the formula Me$_3$Si—O—(—SiMe$_2$—O)$_{55}$(SiMe.C$_3$H$_6$SH—O)$_5$—SiMe$_3$ in Comparative Example 3. The results obtained in these comparative experiments are also shown in Table 2.

TABLE 2

| Organopoly-siloxane prepared in | Number of bonding-peeling cycles of adhesive tape, times | | |
|---|---|---|---|
| | As cured | After 7 days | |
| | | without adhesive tape | with adhesive tape bonded |
| Example | | | |
| 1 | Preparation 1 | 17 | 29 | 20 |
| 2 | Preparation 2 | 18 | 31 | 22 |
| 3 | Preparation 3 | 13 | 22 | 9 |
| 4 | Preparation 4 | 14 | 25 | 11 |
| 5 | Preparation 5 | 9 | 17 | 7 |
| Comparative Example | | | |
| 1 | (None) | 0 | 0 | 0 |
| 2 | (See text) | 6 | 10 | 5 |
| 3 | (See text) | 2 | 5 | 0 |

EXAMPLES 6 TO 8 AND COMPARATIVE EXAMPLES 4 TO 6

In Examples 6 to 8, an aminoalkyd resin-based coating composition prepared from 100 parts of an aminoalkyd resin (Bekkozol M7652-55, a product by Dai-Nippon Ink Chemical Co.), 3.5 parts of p-toluene sulfonic acid and 10 parts of a thinner solvent was admixed with 1.0 part of the organopolysiloxane prepared in either one of Preparations 1 to 3, respectively. The coating compositions were each applied to an overlay paper for plywood boards in a coating thickness of 15 to 20 g/m$^2$ using a bar coater #20 and, after air drying, heated at 70° C. for 10 minutes to give a cured film of the coating composition on the paper. These coated papers were subjected to the peeling test of the coating film using a pressure-sensitive adhesive tape in the same manner as in the preceding examples either as cured or after standing for 7 days at room temperature with the adhesive tape bonded thereto to give the results shown in Table 3 below.

Further, the coated papers were each cut into a piece of 5 cm by 5 cm square, on which an adhesive of polyvinyl acetate emulsion (Bond, a product by Konishi Co.) was spread over an area of 3 cm diameter. A 5 cm by 5 cm wide wood plate was put on the thus adhesive-coated paper and kept as such for 3 days to adhesively bond the paper and wood plate together. Thereafter, the paper was peeled off the wood plate and the condition of the coating film on the paper was visually examined to find that the coating film on the paper was not destroyed in each of Examples 6 to 8.

For comparison, the same tests as above were repeated excepting omission of the organopolysiloxane additive in Comparative Example 4 and replacement of the organopolysiloxane additive with the same amount of either one of the organopolysiloxanes used in Comparative Examples 2 and 3 in Comparative Examples 5 and 6, respectively. The results of these comparative experiments are also shown in Table 3 indicating that the properties of the coating film on the paper could be greatly improved according to the present invention.

TABLE 3

| Organopoly-siloxane prepared in | Number of bonding-peeling cycles of adhesive tape, times | | Condition of coating film after adhesive test |
|---|---|---|---|
| | As cured | After 7 days with adhesive tape bonded | |
| Example | | | |
| 6 | Preparation 1 | 18 | 15 | A |
| 7 | Preparation 2 | 21 | 17 | A |
| 8 | Preparation 3 | 17 | 13 | A |
| Comparative Example | | | |
| 4 | (None) | 0 | 0 | B |
| 5 | (See text) | 7 | 2 | B |
| 6 | (See text) | 15 | 12 | A |

A: The coating film was not destroyed.
B: The coating film was destroyed.

What is claimed is:

1. A method for improving the surface properties of a coating film formed from a coating composition selected from the group consisting of oil paints, water-based paints, spirit varnishes and compositions having a cellulose derivative or synthetic resin as a vehicle which comprises admixing the coating composition with an organopolysiloxane having, in a molecule, at least one 2,3-dihydroxypropylamino-substituted monovalent hydrocarbon group selected from the class consisting of the groups represented by the general formula

—R—NH—CH$_2$—CHOH—CH$_2$OH,

—R—NH—CH$_2$—CH$_2$—NH—CH$_2$—CHOH—CH$_2$OH, and

—R—N(CH$_2$—CHOH—CH$_2$OH)—CH$_2$—CH$_2$—NH—CH$_2$—CHOH—CH$_2$OH in which R is a divalent aliphatic hydrocarbon group having 1 to 6 carbon atoms, bonded to the silicon atom, and wherein the other organosiloxane units have the formula $R^2_c SiO_{(4-c)/2}$, wherein $R^2$ is a substituted or unsubstituted monovalent hydrocarbon group selected from the group consisting of alkyl cycloalkyl, alkenyl, and aryl, and c is 1, 2 or 3, in an amount in the range from 0.001 to 15 parts by weight per 100 parts by weight of the non-volatile matters in the coating composition.

2. The method as claimed in claim 1 wherein the divalent aliphatic hydrocarbon group denoted by R is a propylene group of the formula —CH$_2$CH$_2$CH$_2$—.

3. The method as claimed in claim 1 wherein the organopolysiloxane has a viscosity in the range from 10 to 100,000 centistokes at 25° C.

4. The composition of claim 1 wherein the vehicle resin is selected from the group consisting of phenolic resins, aminoalkyd resins, epoxy resins, and urethane resins in an oily coating composition.

5. The composition of claim 1 wherein the vehicle resin is selected from the group consisting of polyvinyl chloride resins, polyvinyl acetate resins, and polyacrylic resins in an emulsion type coating composition.

6. The composition of claim 1 wherein the monovalent hydrocarbon group is selected from the group consisting of methyl, ethyl, propyl, butyl, hexyl, octyl, decyl, docecyl, cyclohexyl, vinyl, allyl, hexenyl, phenyl, tolyl and 2-phenylethyl.

7. The composition of claim 1 wherein the monovalent hydrocarbon group has a part or all of its hydrogen atoms substituted by halogen or cyano.

* * * * *